Patented May 2, 1950

2,505,895

UNITED STATES PATENT OFFICE 2,505,895

CATALYST PREPARATION

Llewellyn Heard, Hammond, Ind., assignor to Standard Oil Company, Chicago, Ill., a corporation of Indiana No Drawing. Application July 22, 1944, Serial No. 546,199

3 Claims. (Cl. 252—448)

This invention relates to the preparation of catalysts and more particularly to a method of forming gel catalysts in the form of discrete particles. Still more particularly the invention relates to the forming of spherical particles of hydrogels to produce catalysts having discrete particles of rounded or spheroidal shape substantially without agglomeration or clustering.

One object of the invention is to effect the formation and drying or dehydration of spheroidal catalyst gel particles in an economic manner without rupture or distortion of the surface, thereby producing a catalyst having a higher physical strength and higher resistance to attrition than when prepared in the ordinary manner. Another object of the invention is to produce catalyst gel particles of small size and high catalytic activity. Still another object of the invention is to prepare catalysts and particularly hydrocarbon conversion catalysts of high sustained activity or long life and uniform small particle size. Other objects of the invention will be apparent from the following description thereof.

Heretofore it has been the practice in preparing catalysts from gels, for example silica hydrogel or alumina hydrogel, to coagulate the gel in a mass which may be dried directly or after cutting into irregular pieces and washing with water or other washing liquids. On drying wet massive hydrogels of this type, generally by standing in dry air or gently heating in a ventilated oven, stresses of considerable magnitude are developed in the gel which induce fracturing of the pieces or mass so that the final dried gel product is a granular material having a considerable range of particle size from small lumps down to a very fine powder. It has heretofore been the practice to grade such catalyst by screening and/or grinding if necessary, generally after ignition to a high temperature. The particles of catalyst prepared in this way still posses strains which eventually result in their fragmentation into smaller particles during use which eventually render the catalyst useless for further service, partly because of the difficulty of handling and recovering them and partly because of their unavoidable loss from the apparatus. The very fine particles pass thru cyclone separators and even thru electrical precipitators.

By my process I prepare the catalyst gel particles in rounded or spheroidal form by the coagulation of individual droplets of a sol in a supporting fluid medium, and thus avoid the development of internal strains, because the particles have a uniform structure and symmetrical form. Since each particle of gel is coagulated separately, out of contact with other masses of gel or any other solid surface, it becomes surrounded by a smooth glassy surface which has a natural generally symmetrical orientation with respect to the particle, thereby tending to strengthen the particle and increase its resiliency and resistance to abrasion and rupture. As a result when this catalyst is used in systems wherein it is maintained in a turbulent fluidized state, there is a minimum loss of energy in the catalyst mass due to friction between the catalyst particles. Likewise the life of the catalyst is greatly increased as a result of the resistance to comminution by abrasion, and wear of the apparatus is also reduced.

In preparing catalyst in spheroidal form by my process, a suitable sol, usually a metal oxide sol is prepared in metastable form and passed into a coagulating liquid wherein droplets are produced which rapidly coagulate into spheroidal particles of gel. Various methods may be employed for carrying out this part of the process. Thus the sol, for example silica sol produced by the rapid mixing of sodium silicate solution and a strong acid such as hydrochloric or sulfuric acid, may be formed into droplets by a spray or distributor either beneath the surface or above the surface of the coagulating bath. If fine streams of the sol are introduced below the surface of the bath, they will break up into droplets of more or less uniform size depending on the surface tension and viscosity of the oil and the sol, the size of the sol stream, coarseness of spray, degree of agitation, and other factors.

Alumina sols, iron oxide sols, chromium oxide sols, and various other sols may be employed in this process for preparing catalysts of the corresponding oxides. The sol is preferably prepared in metastable condition, the amount of electrolytes, temperature, etc. being adjusted so that coagulation will occur on standing for about 1 to 60 minutes, preferably about 30 minutes. However, more stable sols may be used, providing special coagulating agents are used subsequently. The reagents employed for preparing the sol are conveniently dissolved in two separate solutions which are mixed just before forming the sol into droplets in the coagulating medium. Thus a solution of sodium aluminate may be mixed with acetic acid and instantly formed into droplets of sol which quickly coagulate to alumina hydrogel. In the case of very unstable sols, mixing may be effected within a special mixing nozzle, extended into the coagulating bath.

I have found that especially desirable results are obtained by the use of a coagulating bath composed of liquids having a substantial water solubility and water dissolving power which are not fully miscible in water. Examples are amyl alcohol, amyl acetate, n-butyl and isobutyl acetates, pentasol—(a commercial C5 alcohol mixture), ethyl laurate, isobutyl lactate, hexyl alcohol, secondary and isobutyl alcohol, ethyl and methyl acetate or propionate, nitrobenzene, aniline, dibutyl ether, dibutyl phthalate, dimethyl phthalate, ethyl acetate, furfural, phenol cresol, and methyl-ethyl ketone. Polyhydroxy alcohols and simple alcohols up to 18 carbon atoms may be used at temperatures where they are liquids. Other water soluble but not completely miscible ketones, aldehydes, alcohols, esters, ethers, nitrocompounds, halogen derivatives, amines and mixtures thereof may be employed. These liquids or solvents I characterize by their "solubility index" which is defined as the sum of the solubility in water, expressed as per cent by weight and the solubility of water in the solvent, also per cent by weight divided by two, both solubilities being determined at 20° C. I can employ solvents having a solubility index between 0.2 and 25% altho I prefer solvents with an index of about 5 to 15%. If desired, I may combine two or more mutually soluble solvents to obtain the optimum characteristics. Thus I may modify the water soluble solvent by adding them to a mineral oil much as kerosene, naphtha, benzene or a light lubricating oil having a negligible solvent power for water, the mixture, however, having a solubility index in the range of 0.2 to 25%. When ammonia is used as a coagulating agent, the concentration may be increased by employing pressure, e. g. 10 to 100 lbs./sq. in. The solvent should have no adverse effect on the sol or gel by reacting chemically therewith.

In order to facilitate the coagulation of the sol, various coagulating agents may be added to the liquid bath. Thus I may employ ammonia or amines in the bath when coagulating silicic acid sols. Acids, such as acetic, citric, etc., may be employed for speeding the coagulation of the basic sols such as the aluminates, chromates, etc. The depth of the coagulating bath should be sufficient to effect at least a partial coagulation of the droplets of sol to provide a surface or envelop of coagulated gel around each particle so that the particles of gel may thereafter be handled without rupture or agglomeration. It is desirable to use a coagulating agent which is easily soluble in the coagulating liquid. Thus, $NH_3$ is readily soluble in amyl alcohol and rapid setting of the sol droplets is obtained by its use in the case of silica sol.

The temperature of coagulation may vary depending on the character of the sol and of the coagulating bath. For most purposes, room temperature, i. e. 20 to 25° C. is satisfactory, but in certain cases there are advantages in operating at higher temperatures where the gelation can be accelerated thereby. Thus, by operating at 50 to 100° C. and agitating the bath with air or other dry gas, part of the water can be eliminated from the gel particles while in formation, thus speeding the hardening of the gel by abstraction of water from the surface layers of the particles. In this way I can produce a hydrogel product, the particles of which can be dried in an oven or on an air drying shelf without agglomeration.

If agitation of the coagulating bath is undesirable, I can transfer the freshly coagulated gel particles in suspension in the coagulating liquid to a second drying or curing stage where the catalyst is agitated with air and dried to a point of nonagglomeration.

If desired, the gel particles formed in the coagulating bath may be allowed to fall into a layer of water or aqueous solution below the coagulating bath and the particles of catalyst may be further coagulated by the action of acids, bases or salts contained in the water. The water layer may also be simultaneously or alternatively employed to wash the catalyst hydrogel particles free of undesirable reagents, salts or other by-products of the reaction by which they are produced. When washing is necessary it may be accomplished by countercurrently passing a stream of the catalyst hydrogel particles thru a current of fresh water, for example distilled water in a suitable contacting column. In the case of certain catalysts such as alumina gels produced from substantially salt-free sols which may be prepared by the action of water or weak acid on amalgamated aluminum metal, no washing of the gel particles is required and in this case it may be desirable to dispense entirely with the use of a water layer below the coagulating bath. Thus the catalysts gel particles can be mechanically separated from the coagulating bath and are then ready for drying.

Having prepared the catalyst in the form of discrete spherical particles of hydrogel, it is then necessary to remove from them the water of which the hydrogel is largely composed. Thus at this stage the catalyst hydrogels will ordinarily contain about 75 to 95 per cent of water, removal of which has heretofore constituted a difficult problem. If it is attempted to dry the catalyst in the usual way by heating in an oven, it is found that the particles agglomerate into masses or clusters which are difficult to break up. When such catalyst masses are broken up or disintegrated to free the individual particles, it is found that the particles produced in this way are misshapened and weakened by unsymmetrical and non-spheroidal surfaces resulting in subsequent disintegration. Furthermore, such catalyst masses cannot be broken up into individual particles without destruction of a great many of the particles with the production of fine material which it is desired to avoid.

Catalysts prepared in the form of hydrogel particles as described can be successfully dried without agglomeration by suspending them in a suitable liquid and removing a portion of the water in various ways until the particles are rendered no longer agglomerating.

It is preferred to suspend the particles in a liquid bath to prevent agglomeration and remove water, either by absorption in the bath or by evaporation. If desired, a current of air or other gas may be passed thru a heated liquid drying bath and sufficient agitation may be obtained either by a mechanical agitator or by the action of the air currents to assist in preventing agglomeration of catalyst particles in the bath while the initial excess water is being removed and the surfaces of the particles are dried sufficiently to prevent further adhesion. Excess water adhering to the catalyst may also be removed by various means, for example by absorption in porous materials such as blotting paper, by centrifuging, or by replacement with other liquids such as ordinary alcohol. Care must be taken, however, to avoid physical damage to the particles or displacement of water by a solvent, leaving the gel soft and porous later. The bath may be composed of an oil such as naphtha or kerosene or an immiscible liquid partly soluble in water such as any of those liquids mentioned hereinabove having a solubility index of 0.2 to 25%.

When the catalyst particles have been sufficiently dispersed in the dehydrating bath, heat is applied to the bath in an amount sufficient to raise the temperature to a point where the vaporization of water from the catalyst is substantially increased as a result of increased vapor pressure. In order to obtain sufficiently rapid drying it is desirable to operate at a temperature above 150° F. and preferably in the range of about 200 to 300° F. It is often possible to employ still higher temperatures, however, without damage to the catalyst particles, and temperatures of 400° F. have been used. For this purpose a bath of kerosene or amyl alcohol is suitable, a current of air, steam or inert gas, e. g. carbon dioxide, nitrogen or ammonia being injected to obtain the desired agitation and facilitate the removal of water vapors. Where the bath is composed of a lower boiling solvent such as naphtha, for example solvent naphtha having a boiling range of 150 to 260° F. or dry cleaners naphtha having a boiling range of 190 to 330° F., or Stoddard solvent having a boiling range of 300 to 410° F., or ethyl acetate, the bath liquid is usually distilled overhead along with the water evolved from the catalyst, in which case it is condensed with the water, separated therefrom and returned to the bath.

It is not necessary to remove water from the catalyst to complete dryness by means of the desiccating liquid bath as it has been found that after the removal of only about 5 to 50 per cent of the water in the gel the catalyst can be completely dried in an oven or by exposure to dry air without any further danger of agglomeration. I may therefore continuously or intermittently withdraw catalyst from the desiccating bath, separate it from the solvent, and complete the drying in an oven usually at a temperature of about 250 to 400° F. Any solvent adhering to the catalyst may be recovered by extraction or by condensation of the vapors on final drying. After about 12 to 24 hours in the drying oven, the catalyst may then be ignited at an elevated temperature, e. g. 900 to 1200° F., usually for a period of about 24 to 36 hours, whereupon it is in condition for service.

After the catalyst gel particles have been produced in a nonglomerating form they may be washed in any suitable manner to remove salts which may have been used as coagulants or which may have resulted from the reaction by which the sol was produced. In general, the catalyst particles do not agglomerate again after once having been rendered nonglomerating. The catalyst may thus be washed with salt free water before or after the last drying step. Solvent adhering to the catalyst may also be recovered by washing, concentrated and recycled in the system.

Where the salts contained in the catalyst are easily volatile, the washing may be omitted. Thus where aluminum chloride or ammonium chloride are present, they may be driven off during the final ignition step.

The following is a more or less detailed discussion of the method of making my improved catalyst. This method for the preparation of spherical gel catalyst particles, as applied to a specific catalyst, for example silica-alumina, includes the following steps:

(1) Two solutions A and B are prepared. A, an acid solution is an aluminum salt in dilute aqueous acid while B, the basic solution, is composed of aqueous sodium silicate. The concentrations of these solutions, as well as the nature of the anions of the acid solution, are of the greatest importance because precipitation may occur with improper adjustment of the concentration, thus upsetting the intended composition of the final product and/or the pH change which occurs with the change in anion may destroy the value of the indicator used, thus causing setting of the sol to occur either too quickly or perhaps not at all.

(2) The two solutions are mixed using a high speed stirrer, usually adding the silicate to the acid solution containing the indicator. At the appropriate indicator change addition of solution is stopped and the sol thus formed should by predetermination show no tendency to thicken until adequate time for its utilization has elapsed. The period of time which ensues between the end of the mixing operation and the appearance of perceptible thickening of the sol, i. e. the setting time, is conveniently about 20 to 30 minutes more or less.

(3) The sol thus prepared is next dispersed in the coagulating medium, where two objectives are attained, viz. (a) the sol is formed into spheroidal particles and (b) the particles are coagulated to a hydrogel. The success of the process depends largely upon this step in the operation.

As indicated hereinabove, the addition of sol to the coagulating bath may be thru a nozzle or jet, dropwise or in a continuous stream, and the proximity of the jet to the bath may determine whether the spherical particles contain gas bubbles after setting. Still more important, the size of the particles can be determined by the pressure under which the sol stream enters the bath, other things being equal.

With the sol in question it is desirable to maintain the bath essentially immiscible but with sufficient basic character to complete the setting of the sol, the basic character preferably being obtained by the addition of a suitable basic substance such as ammonia. The time in which the setting of the droplets of sol takes place is of great consequence with respect to the structure and morphology of the ultimate gel particles. The particles of hydrogel produced in the initial set must become sufficiently strong during the period of their contact with the setting medium or coagulating bath to prevent fusion with one another, agglutination, deformation due to the weight of the hydrogel particles as they pile up on the bottom of the reactor, and disintegration from handling the particles and removing them from the reactor or coagulating bath.

The particles of gel need not descend thru the bath but may be caused to ascend by adjusting the density of the setting medium. Although excellent spherules have thus been prepared, the usual method is to employ the descending technique.

The time element in setting the gel particles is of principal concern in allowing the spherules to absorb enough base from the medium to set them sufficiently before destructive influences are brought to bear upon them. By increasing the viscosity or density of the setting medium, the time may be increased and by increasing the concentration of the base in the medium, the rate of setting may be increased, thus facilitating the production of the desired spheroidal particles.

Where the base is a gas such as ammonia the solubility is an important factor, and this invention is particularly concerned with increasing solubility of the coagulating agent, particularly ammonia in the coagulating bath.

The solubility of water in the coagulating medium is an important factor, for as soon as gelation has occurred syneresis sets in to squeeze aqueous salt solution from the gel particles out into the medium. The base, e. g. ammonia, is generally more soluble in water than in the coagulating bath and after water is absorbed by the bath, a general desaturation of the medium occurs with respect to basic material, rendering the remainder of the bath ineffective as regards spherule setting.

Many liquids have been found ineffective as setting media for the formation of spheroidal gel particles in sols because their setting ability at the outset was rapidly lost and thereafter could not be restored. As an example, a mixture of naphtha and carbon tetrachloride saturated with ammonia gas was employed, the carbon tetrachloride being added to adjust the density to about the same as that of the sol. The sol particles descended very slowly thru the bath contained in a vertical tube, thus providing sufficient time for adequate gelation, and it was possible to fill the entire tube with perfectly formed spherules. The setting medium, however, soon became milky and opaque owing to the accumulation of synerized salt solution, and after removing the gel product it was found that the setting medium could not be restored by adding additional ammonia. Another quantity of the bath, on standing several hours in an open vessel, gave rise to a peculiar phenomenon in which the bath separated into three layers, the upper layer being largely naphtha and the middle layer water of a milky appearance.

(4) On removing the spherules from the setting medium, they are preferably washed with distilled water using the upflow method. After the passage of about 40 to 50 volumes of water in about 24 hours, no further test for salts is obtained from the effluent. If the gel particles are now dried, for example on a tray at room temperature up to about 150° F. in a slow stream of air, great care must be taken to prevent too rapid drying resulting in cracking of the particles. Agglomeration is also generally observed in tray drying and suspension drying as described hereinabove is preferred.

In the final calcining step, the temperature is usually raised stepwise, for example, at 100° F. intervals using about 8 to 10 hours to reach a temperature of 950 to 1050° F. A slow stream of air passing thru the bed during heating removes carbonaceous residue by combustion. If the amount of said residue is large the oxygen content of the air should be controlled to avoid exothermic overheating.

In order to prepare a catalyst having a definite composition of silica and alumina, it is necessary to control very carefully the respective concentrations of solutions A and B. As a specific example, the following solutions have been used:

Solution A:
  800 g. $Al_2(SO_4)_3 \cdot 18 H_2O$
  280 cc. of 95.5–96.5% $H_2SO_4$
  Made up to 17 liters with distilled water Solution B:
  9 kgs. (6.43 liters) sodium silicate
  (28.5% $SiO_2$ N brand water glass)
  Made up to 17.72 liters with distilled water.

About 125 to 130 volumes of solution B are equivalent to 200 volumes of solution A. This ratio yields a catalyst containing about 5% $Al_2O_3$, dry basis. If the concentration of the above solution is increased, for example to double, precipitation of a gelatinous mass rather than a gel occurs. An optimum concentration of the solution was found to be as follows:

Solution A:
  800 g. $Al_2(SO_4)_3 \cdot 18 H_2O$
  120 cc. of 95.5–96.5% $H_2SO_4$
  Made up to 17.0 liters Solution B:
  3.22 liters N brand water glass
  Made up to 17.72 liters.

When these solutions are mixed rapidly in equal volumes a sol is obtained which on gelation produces a very active catalyst for hydrocarbon conversion processes.

While I do not desire to be limited to any theory for explanation of the excellence of gel catalyst produced by coagulation in the presence of alcohols and esters, I believe that at least two factors are involved: (1) capability of the medium to retain $NH_3$ for aiding the gelation of acid sols, and (2) sufficient solvent power for water to accept synerized water from the surface of hydrogel particles. At the surface of the fresh hydrogel particles, such a medium should, of course, be capable of precipitating as such with dissolved synerized water without forming a colloid when said medium is used in combination with a hydrocarbon oil as described above. The medium should also be adaptable for easy separation from synerized water, such as by distillation and fractionation, in order to make possible recovery and reuse of the medium.

In fluidized catalyst operations, where the catalyst is maintained in suspension by an upflowing stream of gases undergoing reaction, it is generally desirable to employ a catalyst having a particle size of about 50 to 250 mesh. Catalyst coarser than 50 mesh is not so readily maintained in fluidized form except when a considerable amount of finer catalyst is also present. If the particle size is appreciably finer than 250 to 300 mesh, there is difficulty in recovery. When employed in upflow reactors as in the conversion or cracking of hydrocarbons for the formation of gasoline and other petroleum products, it is generally desirable to employ upflow vapor velocities of the order of 0.2 to 4 feet per second and a catalyst density of about 0.3 to 0.8 of the density of the catalyst at rest. Relative weight velocity may be about 0.4 to 10 lbs. feed per hr. per lb. catalyst in the reactor depending on the size of the catalyst particles, temperature and other factors. For hydrocarbon conversion, a temperature of about 850 to 1100° F. is usually used. The partially spent catalyst withdrawn from the reactor is stripped of hydrocarbons by means of steam or other vapor and is then regenerated by oxidation with an oxygen-containing gas at about 900–1200° F. to remove deposits of carbon, after which it can be used again repeatedly. The symmetrical strain-free structure of our catalyst contributes to long life and minimum degradation from frequent heating and recycling.

Having thus described my invention what I claim is:

1. The process of preparing gel catalysts in the form of discrete rounded particles which comprises dispersing hydrosol stable for a period of about one minute in the form of droplets in a coagulating bath consisting of a liquid incompletely miscible with water having a water-solubility index of about 0.2 to 25 per cent, retaining the said droplets of hydrosol within said bath for sufficient time to effect substantial gelation thereof, accelerating the rate of gelation of said droplets by dehydrating said bath by passing a current of a drying gas therethru in the presence of the dispersed droplets, separating the resulting catalyst gel particles from the coagulating bath and drying them to produce the desired catalyst.

2. The process of claim 1 wherein said dehydration is effected by passing a current of air thru said coagulating bath and maintaining the temperature of said bath above about 150° F., thereby removing water from said bath by evaporation in said current of air.

3. The process of claim 1 wherein the liquid composing said coagulating bath is amyl alcohol.

LLEWELLYN HEARD.

REFERENCES CITED

The following references are of record in the file of this patent:

UNITED STATES PATENTS

| Number | Name | Date |
| --- | --- | --- |
| 435,198 | Alexander | Aug. 26, 1890 |
| 1,614,636 | Wachtel | Jan. 18, 1927 |
| 1,755,496 | Behrman | Apr. 22, 1930 |
| 2,085,129 | Stoewener | June 29, 1937 |
| 2,232,727 | Peterkin et al. | Feb. 25, 1941 |
| 2,284,248 | Baker et al. | May 26, 1942 |
| 2,323,432 | Walton | July 6, 1943 |
| 2,384,946 | Marisic | Sept. 18, 1945 |
| 2,435,379 | Archibald | Feb. 3, 1948 |
| 2,450,394 | Brown et al. | Sept. 28, 1948 |
| 2,474,910 | Pierce et al. | July 5, 1949 |

OTHER REFERENCES

Neuhausen et al.: "Organogels of Silicic Acid," Journal American Chemical Society, vol. 43, 1921, pp. 1844–1846.